(12) United States Patent
Neale (10) Patent No.: US 10,123,670 B2
(45) Date of Patent: Nov. 13, 2018

(54) MANUFACTURING BYPRODUCT COLLECTION SYSTEMS AND METHODS

(71) Applicant: THE BOEING COMPANY, Chicago, IL (US)

(72) Inventor: Andrew Lawrence Neale, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 140 days.

(21) Appl. No.: 15/209,158

(22) Filed: Jul. 13, 2016

(65) Prior Publication Data

US 2018/0014705 A1  Jan. 18, 2018

(51) Int. Cl.
*A47L 5/02* (2006.01)
*B23Q 11/00* (2006.01)

(52) U.S. Cl.
CPC ............ *A47L 5/02* (2013.01); *B23Q 11/0046* (2013.01); *B23Q 11/0071* (2013.01)

(58) Field of Classification Search
CPC ........... A47L 5/02; A47L 5/38; D01H 11/005; B23Q 11/0046; B65H 270/31; B08B 15/002

See application file for complete search history.

(56) References Cited

U.S. PATENT DOCUMENTS

| | | | |
|---|---|---|---|
| 5,295,771 A * | 3/1994 | Wehrmann | B08B 15/026 15/300.1 |
| 5,527,207 A | 6/1996 | Azar | |
| 6,053,674 A | 4/2000 | Thompson | |
| 2005/0119700 A1* | 6/2005 | Klobe | A61H 9/005 606/237 |
| 2009/0181606 A1 | 7/2009 | Loveless et al. | |

* cited by examiner

*Primary Examiner* — Robert J Scruggs
(74) *Attorney, Agent, or Firm* — Joseph M. Butscher; The Small Patent Law Group, LLC (57) ABSTRACT

A byproduct collection system is configured to collect byproducts of a manufacturing operation on a workpiece. The byproduct collection system includes a collection shroud defining a collection chamber, and a securing mount coupled to the collection shroud. The securing mount is configured to removably secure the byproduct collection system to a surface of the workpiece so that the collection shroud is proximate to a working location of the workpiece during a working operation on the workpiece.

24 Claims, 6 Drawing Sheets

MANUFACTURING BYPRODUCT COLLECTION SYSTEMS AND METHODS

FIELD OF THE DISCLOSURE

Embodiments of the present disclosure generally relate to systems and methods of collecting byproducts during manufacturing operations.

BACKGROUND OF THE DISCLOSURE

During manufacturing processes for various products, tools are used to form, connect, cut, drill, grind, and the like. For example, during a manufacturing process for a wing of an aircraft, various holes may be drilled through panels. The holes are configured to receive and retain fasteners, such as bolts, to connect the panels to other components, such as frames, stringers, struts, and/or the like.

A tool, such as a drill, is used to form holes through a panel. As the drill is urged into and through a panel, byproducts such as fumes, dust, debris, and the like are generated. For example, as an operative tip of the drill is urged through the panel, debris in the form of shavings from the panel is pushed through an opposite surface of the panel. Further, during various manufacturing processes, as tools are used to engage workpieces (such as panels, frames, blocks, walls, and the like) fumes, dust, debris, and other such byproducts are generated due to engagement of the workpiece with the operating tools.

In order to collect the various byproducts generated by tools engaging workpieces, customized shrouds are adapted to be directly secured to the tools. Each shroud is specifically configured to fit to a specific tool. If the shroud is compromised, an operator typically needs to search for and find the specific, customized shroud adapted for the specific tool. In short, collection shrouds are generally specifically adapted for particular equipment and manufacturing processes, thereby increasing overall costs.

Additionally, because customized collection shrouds are typically secured directly to a tool, the shrouds are configured to collect byproducts from an operative side of the workpiece. As such, the shrouds generally do not collect byproducts from a backing side of the workpiece that is opposite from the operative side. For example, an individual may use a tool to operate on a workpiece from a front side. A specialized, customized shroud secured to the tool collects byproducts from the front side of the workpiece, as the shroud is directly connected to the tool. However, byproducts generated by the tool interacting with the workpiece may extend and pass through the rear side of the workpiece, and be deposited as foreign object debris, as the shroud is not located on the rear side.

Further, when a specialized, customized shroud is directly mounted to a tool, an overall weight of the tool is increased. Also, the shroud directly coupled to the tool may be obtrusive and cumbersome, and limit the mobility of the tool.

SUMMARY OF THE DISCLOSURE

A need exists for an efficient and cost-effective system and method for collecting byproducts during a manufacturing process. Further, a need exists for a system and method for collecting all or substantially all manufacturing byproducts, whether at or on an operative surface or a backing surface of a workpiece.

With those needs in mind, certain embodiments of the present disclosure provide a byproduct collection system configured to collect byproducts of a manufacturing operation on a workpiece. The byproduct collection system includes a collection shroud defining a collection chamber, and a securing mount coupled to the collection shroud. The securing mount is configured to removably secure the byproduct collection system to a first surface of the workpiece so that the collection shroud is proximate to a working location of the workpiece during a working operation on the workpiece. The working location may be on a second surface of the workpiece that is opposite from the first surface.

In at least one embodiment, the byproduct collection system includes a vacuum port extending from the collection shroud. A vacuum channel extends through the vacuum port and a portion of the collection shroud. The vacuum channel is in fluid communication with the collection chamber. The vacuum port is configured to couple to a vacuum generator.

The securing mount may include at least one suction cup that is configured to removably connect to the first surface of the workpiece. A suction generator may be coupled to the suction cup(s). In at least one embodiment, the suction generator includes a hand pump.

In at least one embodiment, a coupler outwardly extends from an outer portion of the collection shroud. The securing mount is attached to the coupler.

A standoff gap may be formed between an outer rim of the collection shroud and the first surface of the workpiece when the securing mount removably secures the byproduct collection system to the first surface of the workpiece.

Certain embodiments of the present disclosure provide a byproduct collection method for collecting byproducts of a manufacturing operation on a workpiece. The byproduct collection method includes coupling a securing mount to a collection shroud defining a collection chamber, positioning the collection shroud proximate to a working location of the workpiece, removably securing the collection shroud in relation to the workpiece with the securing mount, operating on the workpiece, and collecting the byproducts generated during the operating within the collection shroud.

The byproduct collection method may also include generating a vacuum force with a vacuum generator that is coupled to a vacuum port extending from the collection shroud. A vacuum channel extends through the vacuum port and a portion of the collection shroud. The vacuum channel is in fluid communication with the collection chamber. The byproduct collection method may also include drawing the byproducts collected within the collection shroud into the vacuum through the generating.

Certain embodiments of the present disclosure provide a system for collecting and removing manufacturing byproducts from and around a workpiece. The system includes a byproduct collection system configured to collect the manufacturing byproducts of a manufacturing operation on the workpiece, and a vacuum generator coupled to a vacuum port of the byproduct collection system through a connection conduit. The vacuum generator is configured to generate a vacuum force that draws the manufacturing byproducts into a collection chamber of a collection shroud of the byproduct collection system.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a byproduct collection system that includes a suction mounted collection shroud that is configured to collect manufacturing byproducts, such as fumes, dust, and debris, which may be generated during manufacturing operations. The byproduct collection system is configured to be used in limited access and open areas. In at least one embodiment, the byproduct collection system includes a suction cup mount that is configured to attach a collection shroud to a surface of a workpiece, and allow for hands-free operation. The byproduct collection systems and methods are configured to collect manufacturing byproducts (such as fumes, dust, and debris) that may be generated during manufacturing operations (such as drilling, grinding, welding, soldering, and the like).

The byproduct collection system includes a securing mount that is configured to removably secure the byproduct collection system to a surface of a workpiece. In at least one embodiment, the securing mount includes a suction cup that is configured to removably mount the byproduct collection system to the surface of the workpiece through suction force. The byproduct collection system is configured to be secured to the workpiece and operate without intervention by an individual to collect manufacturing byproducts. The byproduct collection system may be removably secured to the workpiece in non-standard locations such, as the back side of a drilled hole to collect chips and dust generated during the drilling operation. In this manner, embodiments of the present disclosure allow for a light and unencumbered tool to be used (as a specialized shroud need not be secured to the tool). Embodiments of the present disclosure provide byproduct collection systems and methods that protect individuals working on and/or proximate a workpiece from manufacturing byproducts, such as fumes, dust, debris, and the like that may be generated by tools engaging the workpiece.

Certain embodiments of the present disclosure provide a byproduct collection system that is configured to collect byproducts of one or more manufacturing operations. The byproduct collection system includes a collection shroud that is configured to collect the byproducts. A securing mount is coupled to the collection shroud. In at least one embodiment, the securing mount suction cup includes a suction cup. The collection shroud is in fluid communication with a vacuum port. A vacuum generator is configured to operatively connect to the vacuum port through a connection conduit, such as a flexible hose, tube, or the like.

The collection shroud includes an outer rim. A standoff gap may be maintained about the outer rim when attached to a surface of a workpiece. The standoff gap provides a path for the collection of byproducts from a confined working zone about the shroud perimeter. In at least one other embodiment, the outer rim is configured to sealingly engage the surface of the workpiece, such that no standoff gap is formed. For example, a gasket or seal may be coupled to the outer rim, and sealingly engage the surface of the workpiece.

Certain embodiments of the present disclosure provide a manufacturing byproduct collection method that includes mounting a collection shroud on or within a predetermined operating location of workpiece. The mounting includes using a securing mount to temporarily fix the collection shroud to the predetermined operating location.

Notably, the byproduct collection systems and methods are not specifically tied or otherwise adapted to any particular tool. Instead, the byproduct collection systems and methods may be used in conjunction with all or most tools that are used to operate on a workpiece.

Embodiments of the present disclosure provide byproduct collection systems that leads to reduced cleaning of a workpiece after one or more manufacturing processes. Further, the byproduct collection systems and methods lead to cleaner and safer work environments, due to a reduction in foreign object debris. Also, the byproduct collection systems and methods reduce the chances of individuals inhaling fumes and dust from exotic materials and metals, for example.

Figure 1:
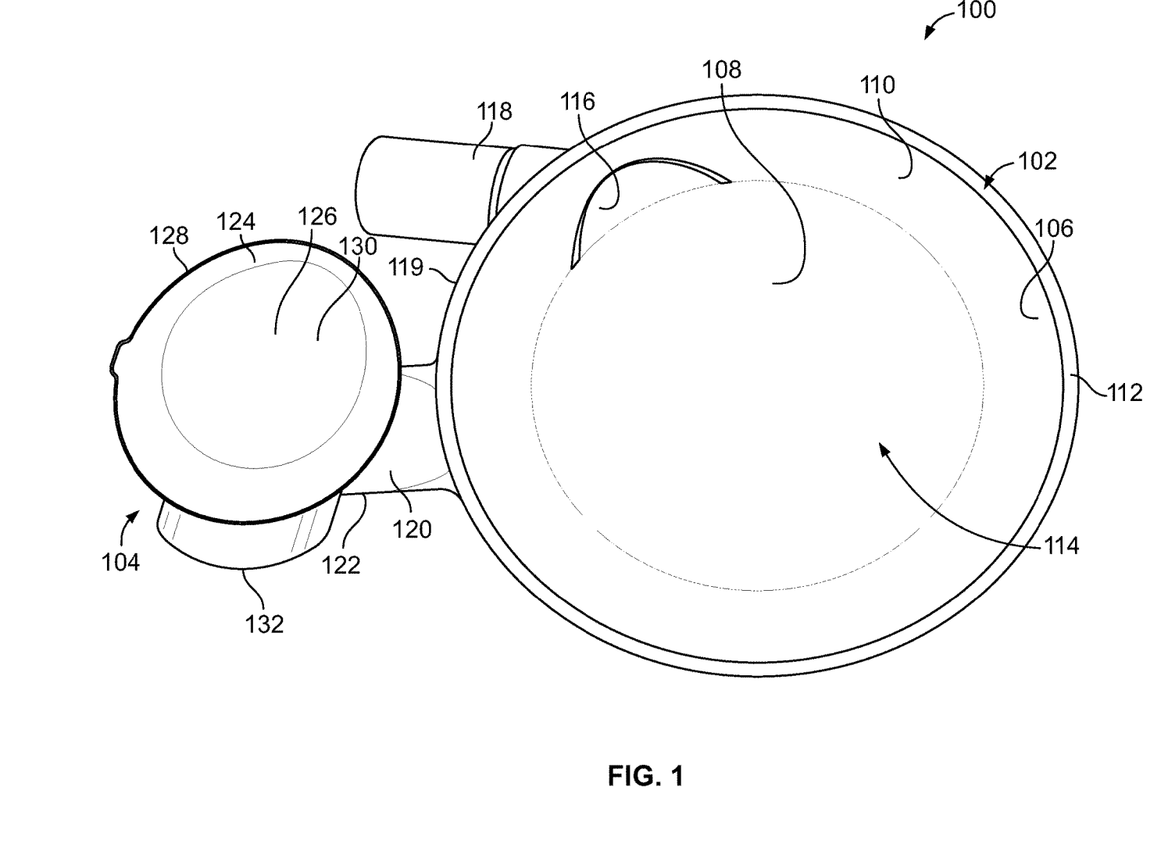
FIG. 1 is a diagrammatic representation of a front perspective view of a byproduct collection system, according to an embodiment of the present disclosure.

FIG. 1 is a diagrammatic representation of a front perspective view of a byproduct collection system 100, according to an embodiment of the present disclosure. The byproduct collection system 100 includes a collection shroud 102 coupled to a securing mount 104.

The collection shroud 102 includes a main body 106 including a base 108 integrally connected to a perimeter wall 110 having an exposed outer rim 112. Internal surfaces of the base 108 and the perimeter wall 110 define a byproduct collection chamber 114 therebetween. The front side of the main body 106 is open, thereby exposing the collection chamber 114. A vacuum channel 116 is formed through a portion of the perimeter wall 110. The vacuum channel 116 extends through the perimeter wall 110 and into and through a vacuum port 118 (such as a tube) that outwardly extends from an outer surface 119 of the perimeter wall 110 opposite from the byproduct collection chamber 114. Optionally, the vacuum channel 116 may be formed through various other portions of the collection shroud 102. For example, the vacuum channel 116 may be formed through a portion of the base 108. Similarly, the vacuum port 118 may extend from various other portions of the collection shroud 102, depending on the location of the vacuum channel 116 formed through the portion of the main body 106.

The collection shroud 102 may have a circular axial cross section. In at least one embodiment, the collection shroud 102 may be formed as a hemisphere. In such an embodiment, the base 108 may not include a flat surface. In at least one other embodiment, the base 108 includes a flat planar surface. The collection shroud 102 may be formed in various other shapes and sizes other than shown. For example, the collection shroud 102 may include a triangular, rectangular, pentagonal, hexagonal, heptagonal, octagonal, or the like cross section. In at least one other embodiment, the collection shroud 102 may include a cross section that is crescent shape, a trapezoidal shape, a parallelogram shape, or various other shapes. In at least one other embodiment, the collection shroud 102 may have a cross section which is an irregular shape.

The collection shroud 102 may couple to the securing mount 104 through a coupler 120 that outwardly extends from the outer wall 119 of the base 108 and/or the perimeter wall 110. The coupler 120 may be or include a beam, strap, strut, flange, arch, or other such protuberance outwardly extending from the collection shroud 102.

The collection shroud 102, the vacuum port 118, and the coupler 120 may be integrally molded and formed as a monolithic, single piece of material. For example, the collection shroud 102, the vacuum port 118, and the coupler 120 may be integrally molded and formed as a single piece of injection-molded plastic. In at least one other embodiment, the collection shroud 102, the vacuum port 118, and the coupler 120 may be an integrally formed piece of metal. Forming the collection shroud 102, the vacuum port 118, and the coupler 120 as a single, integral piece provides a robust and strong construction. Alternatively, the collection shroud 102, the vacuum port 118, and the coupler 120 may be separate and distinct pieces that are assembled together, such as through bonding, fasteners, and/or the like.

The securing mount 104 is secured to the collection shroud 102 via the coupler 120. For example, the securing mount 104 is securely connected to an end 122 of the coupler 120 that is distally located from the collection shroud 102. The securing mount 104 may secure to the coupler through one or more fasteners, adhesives, reciprocal features (such as a slot formed in the securing mount 104 mating with a reciprocal tab formed on the coupler 120), and/or the like.

As shown, the securing mount 104 includes a suction cup 124 having a suction chamber 126 defined by a lip 128 and a base 130. A suction generator 132, such as a hand pump or plunger, is operatively connected to the suction cup 124. The suction generator 132 is configured to be engaged by an individual (such as by depressing a hand pump) to generate a suction force within the suction chamber 126 that causes the lip 128 to removably secure (for example, temporarily fix) to a surface of a structure. To release the suction cup 124 from the surface, the individual engages the suction generator 132 in an opposite manner (such as by outwardly pulling or otherwise releasing the hand pump or a suction release valve coupled thereto) to release the suction force, so that the securing mount 104 may be removed from the surface. As another example, an individual may pull on a release mechanism, such as a tab, lever, handle, or the like, that releases the suction force.

Figure 2:
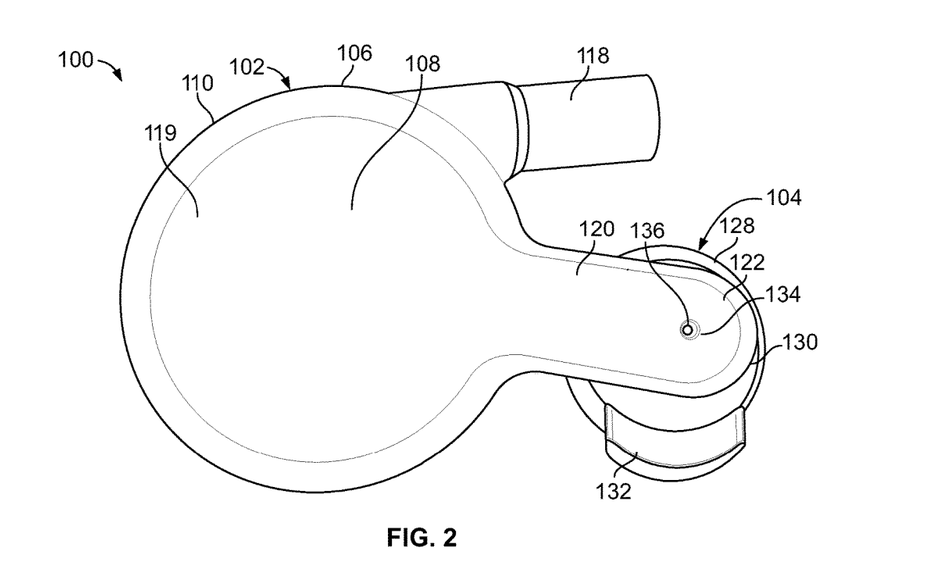
FIG. 2 is a diagrammatic representation of a rear perspective view of a byproduct collection system, according to an embodiment of the present disclosure.
Figure 3:
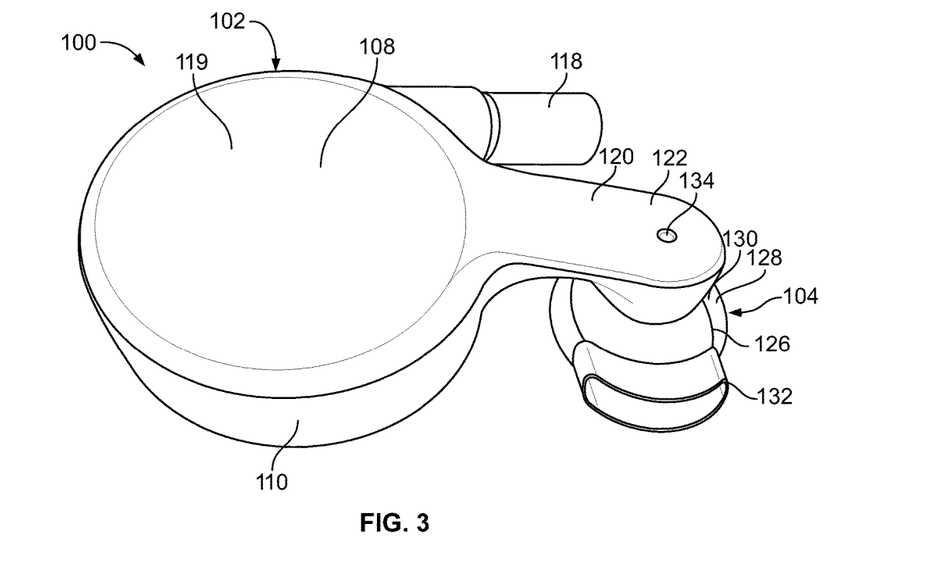
FIG. 3 is a diagrammatic representation of a lateral perspective view of a byproduct collection system, according to an embodiment of the present disclosure.

FIGS. 2 and 3 are diagrammatic representations of rear and lateral perspective views, respectively, of the byproduct collection system 100. Referring to FIGS. 2 and 3, the collection shroud 102 may be formed of a fluid impermeable plastic or metal. As such, fluids (gasses and liquids) collected within the collection chamber 114 (shown in FIG. 1) are unable to pass through the base 108 and the perimeter wall 110.

As shown, a retainer 134 (such as a passage, hole, channel, or the like) may be formed through the coupler 120 at or proximate to the end 122. At least a portion of the retainer 134 retains a protuberance 136 extending from a rear side of the securing mount 104. In this manner, the securing mount 104 may securely mount to the coupler 120. Optionally, the securing mount 104 may include a retainer, and the coupler 120 may include a protuberance that is retained by the retainer. In other embodiments, the coupler 120 and the securing mount 104 may be connected through screws, pins, adhesives, and/or the like.

Figure 4:
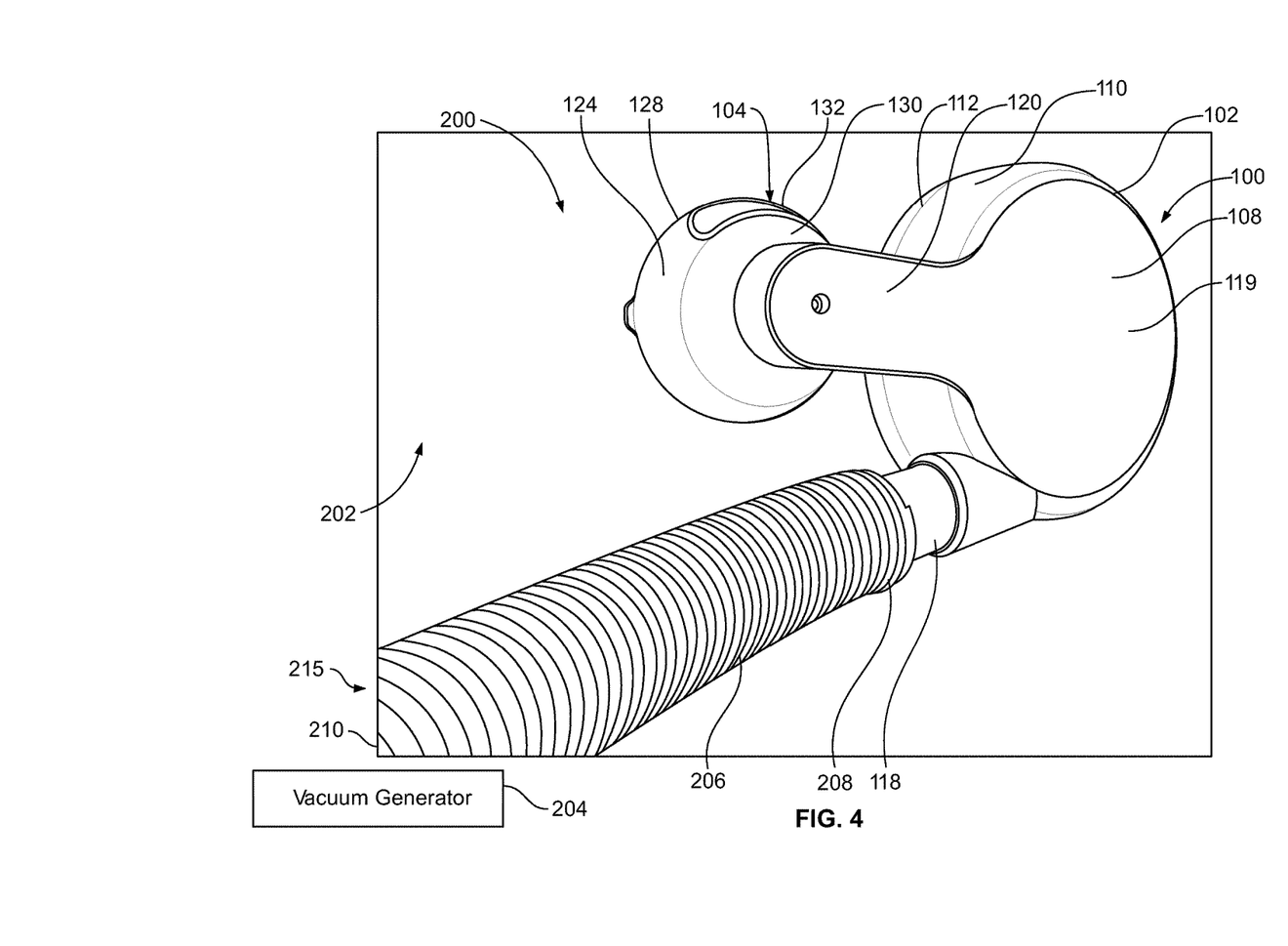
FIG. 4 is a diagrammatic representation of a rear perspective view of a byproduct collection system removably secured to a workpiece, according to an embodiment of the present disclosure.

FIG. 4 is a diagrammatic representation of a rear perspective view of the byproduct collection system 100 removably secured to a workpiece 200, according to an embodiment of the present disclosure. The workpiece 200 may be a panel, frame, block, and/or the like. The byproduct collection system 100 is removably secured to the workpiece 200 in that the byproduct collection system 100 is temporarily fixed to the workpiece 200, such as through operation of the securing mount 104. As shown, the suction generator 132 is depressed such that a suction force is generated in the suction chamber 126 (shown in FIG. 1), thereby securing the suction cup 124 to the workpiece 200.

As shown, the byproduct collection system 100 is removably secured to a first surface, such as backing surface 202, of the workpiece 200. The backing surface 202 is opposite from a second surface, such as operating surface (hidden from view in FIG. 4), of the workpiece 200. The operating surface is the surface facing an individual who engages the workpiece 200 with a tool, such as a drill. The individual operating the tool is located on a side of the workpiece that is opposite from the backing surface 202. The operating surface is configured to initially receive an operative portion of a tool. For example, an operative portion of a drill initially contacts the operating surface and drills through the workpiece from the operating surface towards the backing surface 202.

It is to be understood that the terms first and second surfaces merely indicate two different surfaces of a structure. The backing surface 202 may be the first or second surface of the workpiece 200, while the operating surface may be the other of the first or second surface of the workpiece 200.

A vacuum generator 204 (shown in block form) is operatively coupled to the collection shroud 102 through a connection conduit 206 (only a portion of which is shown). One end 208 of the connection conduit 206 fits around the vacuum port 118, while an opposite end 210 of the connection conduit 206 connects to a portion of the vacuum generator 204. The vacuum generator 204 couples to the byproduct collection system 100 to provide a system 215 for collecting and removing manufacturing byproducts from and around the workpiece 200.

The coupler 120 may couple the securing mount 104 to the collection shroud 102 so that the outer rim 112 of the collection shroud 102 is separated from the backing surface 202 a standoff distance, which provides a small gap between the collection shroud 102 and the backing surface 202. The small gap may be between 0.1 inch and 1 inch, for example. Optionally, the small gap may be less than 0.1 inch or more than 1 inch.

Alternatively, the outer rim 112 may directly contact the backing surface 202. For example, the outer rim 112 may abut against the backing surface 202 such that any gap therebetween is eliminated or otherwise reduced. In at least one embodiment, the outer rim 112 may sealingly engage the backing surface 202, such as through a gasket or seal.

In operation, a working location is first determined. The working location is a location on the operating surface of the workpiece 200 at which a tool or equipment is to engage the workpiece 200. After the working location is determined, the byproduct collection system 100 is secured to the backing surface 202 at an area that may be axially aligned with the working location. For example, the collection shroud 102 may be positioned on or above (if a small gap exists therebetween) the backing surface 202 about and around an outer perimeter envelope of the working location.

After the collection shroud 102 is positioned relative to the working location, the securing mount 104 is engaged to temporarily fix the byproduct collection system 100 to the workpiece 200. For example, the suction generator 132 is shown in an engaged position in FIG. 4, which provides a suction force that securely couples the suction cup 124 to the backing surface 202. The suction force exerted by the suction cup 124 relative to the backing surface 202 temporarily fixes the byproduct collection system 100 to the backing surface 202.

After the byproduct collection system 100 is secured to the backing surface 202, the vacuum generator 204 may be activated to generate a vacuum force. The vacuum force generated by the vacuum generator 204 draws byproducts (such as fumes, dust, debris, and the like) into the byproduct collection chamber 114 (shown in FIG. 1), and into the connection conduit 206 through the vacuum channel 116 (shown in FIG. 1) formed through the perimeter wall 110 and the vacuum port 118. Further, the vacuum force generated by the vacuum generator 204 draws byproducts surrounding the collection shroud 102 through the standoff gap between the outer rim 112 and the backing surface 202. As such, when an individual engages the workpiece 200 with a tool or equipment on the operating side of the workpiece, byproducts of such a manufacturing operation are collected in the collection shroud 102 and drawn to the vacuum generator 204 via vacuum force. In this manner, at least some byproducts of the manufacturing operation do not eject, disperse, deposit, pass, or the like into an environment proximate to the backing surface 202. Further, at least some byproducts of the manufacturing process on or proximate to the operating surface of the workpiece are drawn through a hole formed during the manufacturing process into the collection chamber 114, such as through the vacuum force generated by the vacuum generator 204. Such byproducts are also drawn into the vacuum generator 204.

The collection shroud 102 also provides a barrier that protects individuals from tools or equipment that may pass through the workpiece 200. For example, an operative tip of a drill may pass through the workpiece 200 from the operating surface to and through the backing surface 202. The collection shroud 102 impedes the tip of the drill from passing through the collection shroud 102, thereby providing a safety barrier that prevents the tip of the drill from contacting an individual who may be proximate to the backing surface 202.

When the manufacturing process is complete, the securing mount 104 may be disengaged so that the suction cup 124 may be removed from the backing surface 202. For example, the suction generator 132 may be disengaged to allow the suction force of the suction cup 124 to be released. The byproduct collection system 100 may then be removed from the backing surface 202 and positioned on another portion of the backing surface 202 proximate to a subsequent working location.

Figures 5, 6:
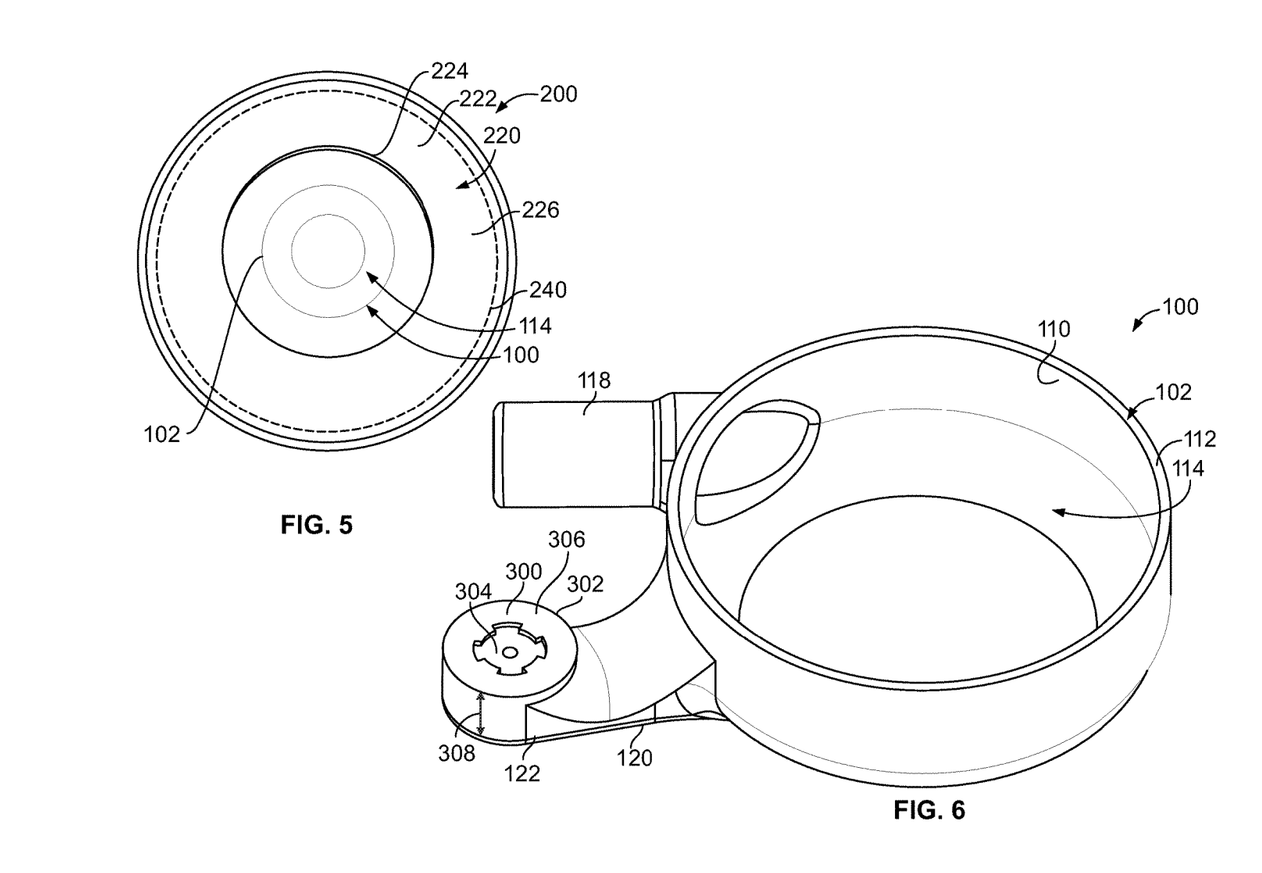
FIG. 5 is a diagrammatic representation of a front view of a portion of a workpiece, according to an embodiment of the present disclosure.
FIG. 6 is a diagrammatic representation of a lateral front perspective view of a byproduct collection system, according to an embodiment of the present disclosure.

FIG. 5 is a diagrammatic representation of a front view of a portion of the workpiece 200, according to an embodiment of the present disclosure. A working location 220 is determined on an operating surface 222 of the workpiece 200. As noted, the operating surface 222 is the surface facing an individual who engages the workpiece 200 with a tool, such as a drill. The operating surface 222 is opposite from the backing surface 202 (shown in FIG. 4).

A hole 224 may be formed through the workpiece 200 from and through the operating surface 222 to and through the backing surface 202 (shown in FIG. 4). A working area 226 may surround the hole 224. A tool may be used to engage the working area 226 to form features on, within, and/or through the working area 226. For example, a drill may be used to form holes through the working area 226.

The collection shroud 102 is positioned on the backing surface 202 (shown in FIG. 1) opposite from the operating surface 222. As shown in FIG. 5, the collection chamber 114 is exposed through the hole 224. The collection shroud 102 may be axially aligned with the working area 226. The outer rim 112 (shown in FIG. 1) of the collection shroud 102 may have a greater diameter than that of the working area 226, and therefore extends beyond an axial envelope 240 of the working area 226. Thus, the working area 226 is aligned with and/or within a perimeter envelope of the collection shroud 102. The perimeter envelope of the collection shroud 102 is a virtual shape having an axial cross section that is axially aligned with the perimeter of the outer rim 112 (shown in FIG. 1) of the collection shroud 102, and which extends from the outer rim 112 through the workpiece 200. As such, byproducts generated during a manufacturing operation on the working area 226 are collected within the collection shroud 102.

FIG. 6 is a diagrammatic representation of a lateral front perspective view of the byproduct collection system 100, according to an embodiment of the present disclosure. The securing mount 104 (shown in FIGS. 1-4) is not shown in FIG. 6. As shown, the coupler 120 may include an attaching member 300 at the end 122. The attaching member 300 is configured to securely attach the securing mount 104 to the coupler 120. The attaching member 300 may include a post 302 having a recessed area 304 formed in an exposed end 306. The recessed area 304 is configured to retain a reciprocal structure formed on the securing mount 104 to securely attach the securing mount 104 to the attaching member 300. The length of the post 308 may be such to ensure that the outer rim 112 of the collection shroud 102 is offset from a surface of a workpiece. For example, the post 308 may be sized to ensure that the securing mount 104 extends a farther distance towards the workpiece than the collection shroud 102, thereby providing a standoff gap between the outer rim 112 and the workpiece when the byproduct collection system 100 is secured to the workpiece.

Figure 7A:
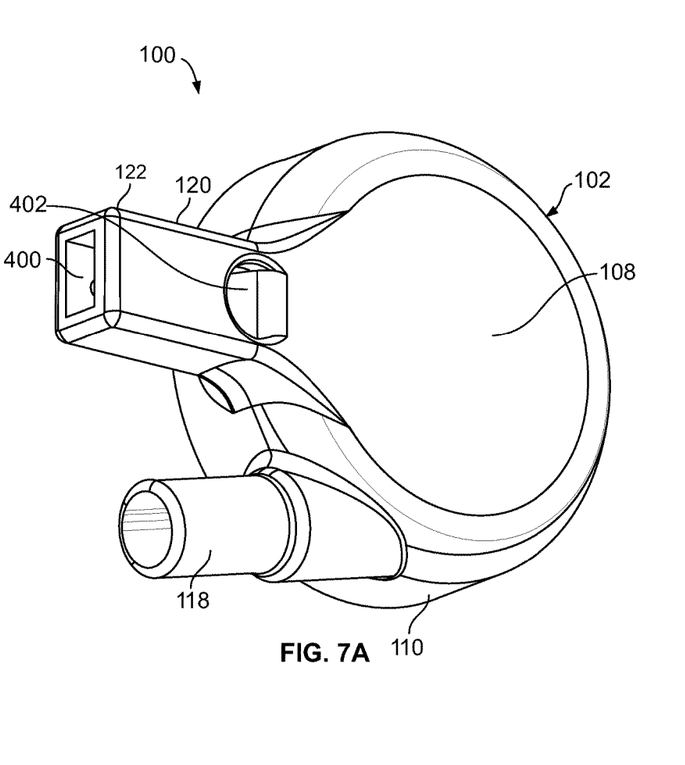
FIG. 7A is a diagrammatic representation of a rear perspective view of a byproduct collection system, according to an embodiment of the present disclosure.

FIG. 7A is a diagrammatic representation of a rear perspective view of a byproduct collection system 100, according to an embodiment of the present disclosure. A securing mount is not shown in FIG. 7. The coupler 120 may include a mounting port 400 formed through the end 122. The mounting port 400 is configured to receive at least a portion and/or a reciprocal feature of a suction assembly.

An exhaust port 402 may be formed through the coupler 120. The exhaust port 402 is configured to provide a vent through the coupler 120 that connects to the suction assembly. The exhaust port 402 is configured to exhaust air. In at least one embodiment, the exhaust port 402 vents compressed air from a vacuum generator. The vacuum generator may be powered by compressed air, and generates a vacuum force that causes a suction cup to securely fix to a surface.

Figure 7B:
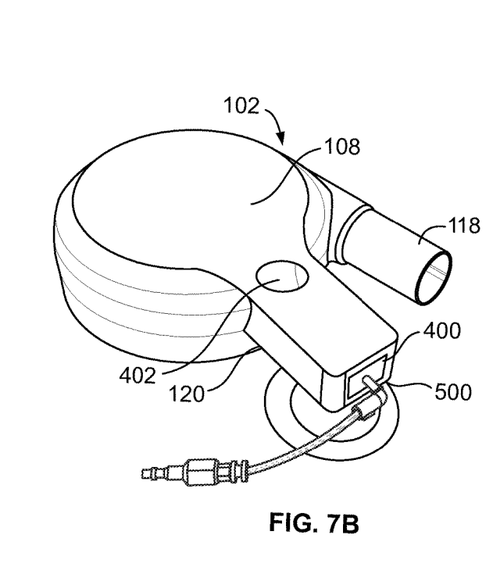
FIG. 7B is a diagrammatic representation of a rear perspective view of a byproduct collection system having an automatic suction generator, according to an embodiment of the present disclosure.

FIG. 7B is a diagrammatic representation of a rear perspective view of the byproduct collection system 100 having an automatic suction generator 500, according to an embodiment of the present disclosure. As shown, the suction generator 500 is positioned within the mounting port 400.

Figure 8:
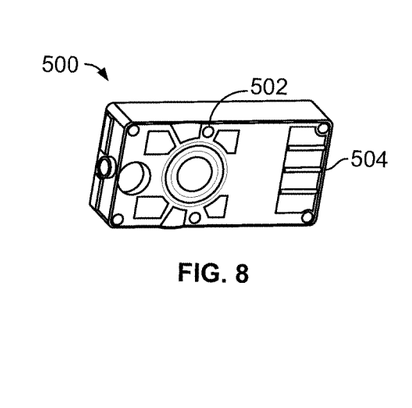
FIG. 8 is a diagrammatic representation of a rear perspective view of a suction generator, according to an embodiment of the present disclosure.

FIG. 8 is a diagrammatic representation of a rear perspective view of the automatic suction generator 500, according to an embodiment of the present disclosure. The suction generator 500 is configured to receive and retain a portion of a suction cup (not shown in FIG. 8) within a suction channel 502. An end 504 of the suction generator 500 is configured to securely couple to the coupler 120 (shown in FIG. 7) such that a portion of the end 504 extends into the mounting port 400. The suction assembly described with respect to FIGS. 7 and 8 is one example of a securing mount, such as the securing mount 104 (shown in FIGS. 1-4). Various other types of securing mounts may be used to removably secure the byproduct collection system 100 (shown in FIGS. 1-7) to a structure. For example, the securing mount may include multiple suction cups. In at least one embodiment, a separate and distinct suction generator may not be used.

Figure 9:
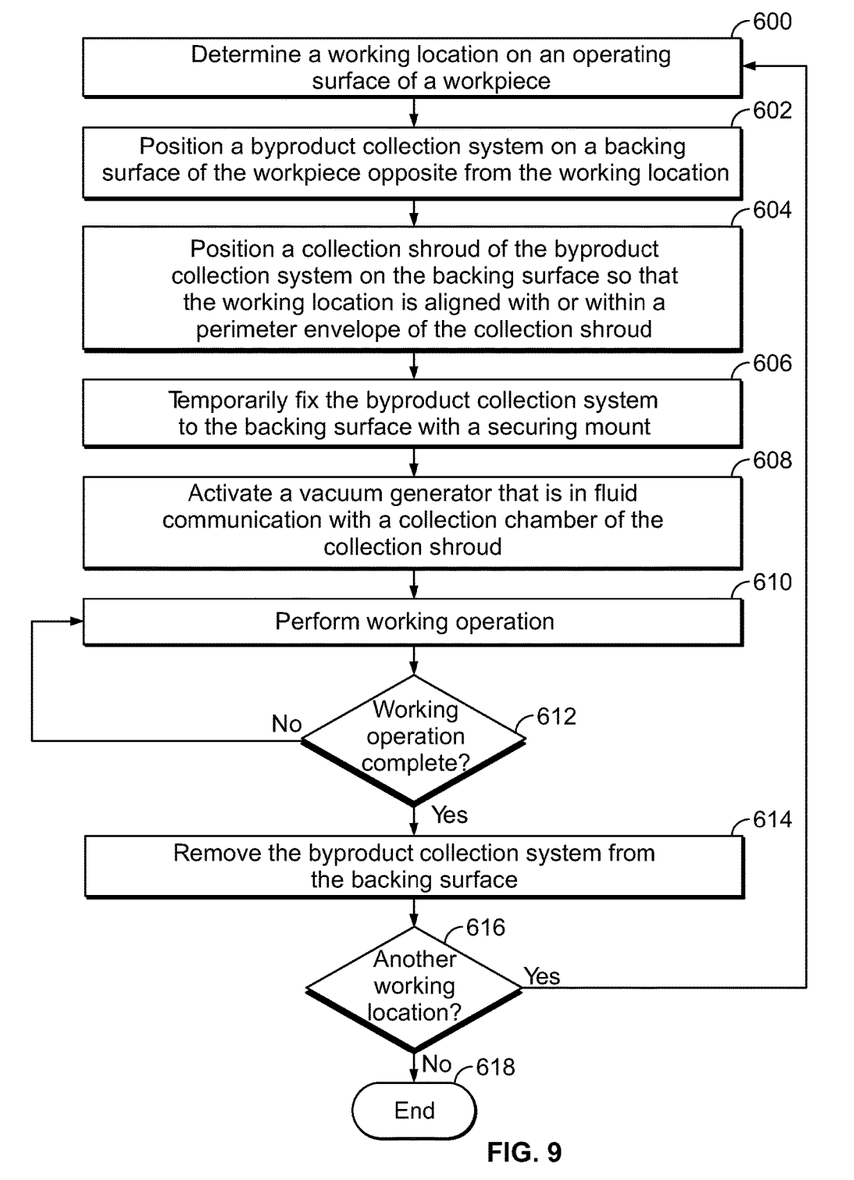
FIG. 9 illustrates a flow chart of a method of collecting byproducts from a workpiece, according to an embodiment of the present disclosure.

FIG. 9 illustrates a flow chart of a method of collecting byproducts from a workpiece, according to an embodiment of the present disclosure. The method begins at 600, at which a working location on an operating surface of a workpiece is determined. At 602, a byproduct collection system is positioned on a backing surface of the working piece opposite from the working location.

At 604, a collection shroud of the byproduct collection system is positioned on the backing surface so that the working location is aligned with or within a perimeter envelope of the collection shroud. At 606, the byproduct collection system is temporarily fixed to the backing surface with a securing mount. At 608, a vacuum generator that is in fluid communication with a collection chamber of the collection shroud is activated.

At 610, a working operation is performed on the working location. The working operation may be drilling, milling, grinding, crimping, soldering and/or the like with one or more tools, for example. During the working operation, the vacuum generator draws byproducts into the collection chamber and to the vacuum generator. At 612, it is determined if the working operation is complete. If the working operation is not complete, the method returns to 610.

If, however, the working operation is complete at 612, the method proceeds to 614, at which the byproduct collection system is removed from the backing surface. At 616 it is determined if there is another working location. If there is another working location, the method returns to 600. If, however, there is not another working location, the method ends at 618.

As described above, embodiments of the present disclosure provide efficient and cost-effective systems and methods for collecting byproducts during a manufacturing process. That is, the systems and methods do not include specialized shrouds that are specially adapted for and directly connected to tools. Embodiments of the present disclosure provide systems and methods for collecting all or substantially all manufacturing byproducts, whether at or on an operative surface or a backing surface of a workpiece.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical (or various other angles or orientations), and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A byproduct collection system configured to collect byproducts of a manufacturing operation on a workpiece, the byproduct collection system comprising:
a collection shroud defining a collection chamber;
a securing mount coupled to the collection shroud; wherein the securing mount is configured to removably secure the byproduct collection system to a first surface of the workpiece so that the collection shroud is proximate to a working location of the workpiece during a working operation on the workpiece; and
a coupler outwardly extending from an outer portion of the collection shroud, wherein the securing mount is attached to the coupler, wherein the coupler comprises;
a mounting port formed through an end, wherein the mounting port is configured to receive at least a portion of a suction generator; and
an exhaust port that is configured to provide a vent through the coupler that connects to the suction generator.

2. The byproduct collection system of claim 1, wherein the working location is on a second surface of the workpiece that is opposite from the first surface.

3. The byproduct collection system of claim 1, further comprising a vacuum port extending from the collection shroud, wherein a vacuum channel extends through the vacuum port and a portion of the collection shroud, wherein the vacuum channel is in fluid communication with the collection chamber, and wherein the vacuum port is configured to couple to a vacuum generator.

4. The byproduct collection system of claim 1, wherein the securing mount comprises at least one suction cup that is configured to removably connect to the first surface of the workpiece.

5. The byproduct collection system of claim 4, further comprising a suction generator coupled to the at least one suction cup.

6. The byproduct collection system of claim 5, wherein the suction generator comprises a hand pump.

7. The byproduct collection system of claim 1, wherein a standoff gap is formed between an outer rim of the collection shroud and the first surface of the workpiece when the securing mount removably secures the byproduct collection system to the first surface of the workpiece.

8. The byproduct collection system of claim 1, wherein the collection shroud comprises a base integrally connected to a perimeter wall having an exposed outer rim, wherein internal surfaces of the base and the perimeter wall define the byproduct collection chamber, wherein the outer rim is configured to directly contact the first surface of the workpiece.

9. The byproduct collection system of claim 8, wherein the outer rim is configured to sealingly engage the first surface of the workpiece.

10. The byproduct collection system of claim 1, wherein the collection shroud and the coupler are integrally molded and formed as a monolithic, single piece of material.

11. A byproduct collection method for collecting byproducts of a manufacturing operation on a workpiece, the byproduct collection method comprising:
positioning a collection shroud proximate to a working location of the workpiece;
removably securing the collection shroud in relation to the workpiece with a securing mount;
attaching the securing mount to a coupler that outwardly extends from an outer portion of the collection shroud, wherein the coupler comprises:
a mounting port formed through an end, wherein the mounting port is configured to receive at least a portion of a suction generator; and
an exhaust port that is configured to provide a vent through the coupler that connects to the suction generator; and
operating on the workpiece.

12. The byproduct collection method of claim 11, wherein the working location is on a second surface of the workpiece that is opposite from the first surface.

13. The byproduct collection method of claim 11, further comprising:
generating a vacuum force with a vacuum generator that is coupled to a vacuum port extending from the collection shroud, wherein a vacuum channel extends through the vacuum port and a portion of the collection shroud, wherein the vacuum channel is in fluid communication with the collection chamber; and
drawing the byproducts collected within the collection shroud into the vacuum through the generating.

14. The byproduct collection method of claim 11, wherein the removably securing comprises removably connecting at least one suction cup to the first surface of the workpiece.

15. The byproduct collection method of claim 14, further comprising coupling a suction generator to the at least one suction cup.

16. The byproduct collection method of claim 15, wherein the suction generator comprises a hand pump.

17. The byproduct collection method of claim 11, wherein the removably securing comprises forming a standoff gap between an outer rim of the collection shroud and the first surface of the workpiece.

18. The byproduct collection method of claim 11, wherein the removably securing comprises sealingly engaging an outer rim of the collection shroud and the first surface of the workpiece.

19. The byproduct collection method of claim 11, wherein the collection shroud and the coupler are integrally molded and formed as a monolithic, single piece of material.

20. A system for collecting and removing manufacturing byproducts from and around a workpiece, the system comprising:
a byproduct collection system configured to collect the manufacturing byproducts of a manufacturing operation on the workpiece, the byproduct collection system comprising:
a collection shroud defining a collection chamber;
a securing mount coupled to the collection shroud, wherein the securing mount is configured to removably secure the byproduct collection system to a backing surface of the workpiece so that the collection shroud is proximate to a working location of the workpiece during a working operation on the workpiece, wherein the working location is on an operating surface of the workpiece that is opposite from the backing surface, wherein the securing mount comprises at least one suction cup that is configured to removably connect to the backing surface of the workpiece, and a suction generator coupled to the at least one suction cup;
a vacuum port extending from the collection shroud, wherein a vacuum channel extends through the vacuum port and a portion of the collection shroud, wherein the vacuum channel is in fluid communication with the collection chamber; and
a coupler outwardly extending from an outer portion of the collection shroud, wherein the securing mount is attached to the coupler, wherein the coupler comprises (a) a mounting port formed through an end, wherein the mounting port is configured to receive at least a portion of the suction generator, and (b) an exhaust port that is configured to provide a vent through the coupler that connects to the suction generator.

a vacuum generator coupled to the vacuum port through a connection conduit, wherein the vacuum generator is configured to generate a vacuum force that draws the manufacturing byproducts into the collection chamber of the collection shroud.

21. The system of claim 18, wherein the suction generator comprises a hand pump.

22. The system of claim 20, wherein a standoff gap is formed between an outer rim of the collection shroud and the backing surface of the workpiece when the securing mount removably secures the byproduct collection system to the backing surface of the workpiece.

23. The system of claim 20, wherein the operating surface is configured to initially receive an operative portion of a tool, and wherein the backing surface is opposite from the operating surface.

24. The system of claim 20, wherein the collection shroud, the vacuum port, and the coupler are integrally molded and formed as a monolithic, single piece of material.

* * * * *